United States Patent [19]
Youngs

[11] Patent Number: 6,119,113
[45] Date of Patent: Sep. 12, 2000

[54] METHOD AND SYSTEM FOR EFFICIENTLY SEARCHING A MASTER DATABASE FOR A DESIRED TARGET WITHOUT ACCESSING THE MASTER DATABASE

[75] Inventor: Edward A. Youngs, Boulder, Colo.

[73] Assignees: U S West, Inc., Denver; MediaOne Group, Inc., Englewood, both of Colo.

[21] Appl. No.: 08/937,218

[22] Filed: Sep. 18, 1997

[51] Int. Cl.[7] .................................................. G06F 17/30

[52] U.S. Cl. .............................. 707/6; 707/10; 709/201; 709/217

[58] Field of Search ............................ 707/5, 6, 10, 1–4, 707/101, 102, 104, 204; 341/79, 50; 395/200.3, 200.32, 200.33–200.36, 200.47, 200.48, 200.49, 200.76; 709/203, 201, 213, 217–219

[56] References Cited

U.S. PATENT DOCUMENTS

| | | | |
|---|---|---|---|
| 5,202,986 | 4/1993 | Nickel | 707/6 |
| 5,463,389 | 10/1995 | Klayman | 341/51 |
| 5,495,608 | 2/1996 | Antoshenkov | 707/3 |
| 5,592,665 | 1/1997 | Lahaije | 707/4 |
| 5,724,597 | 3/1998 | Cuthbertson et al. | 395/793 |
| 5,748,953 | 5/1998 | Mizutani et al. | 707/6 |
| 5,754,938 | 5/1998 | Herz et al. | 455/4.2 |

OTHER PUBLICATIONS

"A Computer Architecture to Support Natural Full Text Information Retrieval," Ray Smith et al., Proceedings of the 1988 IEEE Conference, Southeastcon, IEEE, pp. 197–199, Dec. 1988.

*Primary Examiner*—Hosain T. Alam
*Attorney, Agent, or Firm*—Brooks & Kushman

[57] ABSTRACT

A method and system for efficiently searching a master database includes a memory device for storing a subset of the master database in an auxiliary data-base. A computer program receives an input signal corresponding to the search and processes the input signal with the auxiliary database to determine the presence or absence of qualifying search targets. Thus, target information is determined prior to actually accessing the database.

8 Claims, 3 Drawing Sheets

| TARGET ENTRY SEQ. NO. | | | |
|---|---|---|---|
| 1 | Q 55 | | |
| 2 | U 55 | R 116 | |
| 3 | I 54 | A 116 | |
| 4 | N 49 | ... | |
| 5 | E 1 QUINE | L 13 QUINLAN | |
| 6 | | A 13 QUINN | R 1 QUIRK | O 1 |
| 7 | | N 13 QUINNEY | T 10 QUINT | S 3 | Z 1 | C 1 |
| 8 | | | E 1 QUINTER | A 3 QUINTANA | T 3 QUIST | A 1 QUIZAR | K 1 QUOCK |
| 9 | | | N 1 QUINTIN | | | | |

METHOD AND SYSTEM FOR EFFICIENTLY SEARCHING A MASTER DATABASE FOR A DESIRED TARGET WITHOUT ACCESSING THE MASTER DATABASE

TECHNICAL FIELD

This invention relates to methods and systems for efficiently searching a database.

BACKGROUND ART

The searching of large databases to obtain a target based on an input signal may be inefficient and costly due to the amount of computer resources utilized in the search. It is, thus, desirable to reduce the amount of computer resources used in searching such databases. A known system disclosed in U.S. Pat. No. 5,592,665, issued to Lahaige, utilizes an index stored in the database. The index includes an initial part of a label header, one or more secondary pointers, and an indication of whether all data items having that initial part are contained in only one or in a plurality of blocks of data in the database. First, the index is accessed with the initial part of the label header. If the index item pertaining to the latter initial part is contained in only a single block, the pointer in that index item points to that single block and the block is stored in a foreground memory. If the data items having the initial part are contained in a plurality of data blocks, the pointer of the current index item points to a further index item having the current initial part extended by a next successor label header, whereupon the process repeats for the next extended label header. Thus, the target data is identified first in the index before it is brought to the foreground memory. During the entire process, however, the computer resource is actually accessing the database.

The use of a Dual-Tone Multifrequency (DTMF) keypad to search limited databases, such as an employee telephone number database, is also known. Such applications have relatively low implementation costs and relatively high usage efficiency. The use of a DTMF keypad to search large databases, such as a White Pages directory, is not performed as efficiently and cost effectively. Existing systems proceed in three phases: search string entry, database retrieval, and listing report. After accessing the system, the user or application is prompted to enter a search string that is terminated either explicitly (e.g., by entering a "#") or implicitly (e.g., by reaching a criterion number of digits or by pausing long enough to time out). The search string is then used to query the database for matching entries. If there are no matching entries, the user or application is so informed.

If there are fewer than the system criterion number of matching entries, the user or application is informed and may be given reporting options or just given the matches. If there are more than the system criterion number of matching entries, the user or application is so informed and may be given the option of entering additional information.

In all of the situations described above, the database is queried at least once even though in some cases the user or application does not receive any target information. Thus, the known systems may be inefficient and costly, especially in cases when the user or application possesses too much or too little information to direct the search efficiently. In such cases, either too much search information is entered to locate the target or determine none exists; or too little information is entered and multiple searches are required with no assurance of success.

DISCLOSURE OF THE INVENTION

It is a general object of the present invention to provide a method and system for efficiently searching a large database while providing immediate feedback of the number of qualifying targets, if any, prior to actually searching the database.

In carrying out the above object and other objects, features, and advantages of the present invention, a method is provided for determining the presence or absence of qualifying search targets and their number, if any, prior to a search of a master database. The method includes the step of storing a subset of the master database in an auxiliary database. The method also includes the step of receiving an input signal corresponding to the search. Finally, the method includes the step of processing the input signal with the auxiliary database to determine the presence or absence of qualifying search targets without accessing the master database.

In further carrying out the above object and other objects, features, and advantages of the present invention, a system is also provided for carrying out the steps of the above described method. The system includes a memory device for storing a subset of the master database in an auxiliary database. The system also includes a computer program for receiving an input signal corresponding to the search and processing the input signal with the auxiliary database to determine the presence or absence of qualifying search targets without accessing the master database.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 is an exemplary partial search tree representation of a predetermined master database;

FIG. 2 is the partial search tree representation of FIG. 1 illustrating the compression feature of the present invention;

BEST MODES FOR CARRYING OUT THE INVENTION

Figure 3:
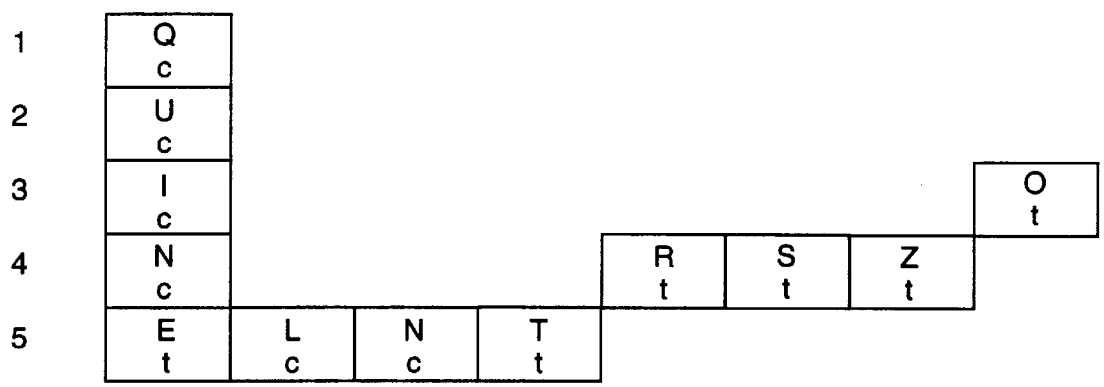
FIG. 3 is an exemplary data structure utilized to achieve compression efficiency.

A master database is represented as a series of records, each consisting of one or more alphanumeric fields. As an example, an excerpt from a White Pages directory is illustrated as follows:

TABLE I

1. QUINE
2. QUINLAN
3. QUINLAN
4. QUINLAN
5. QUINLAN
6. QUINLAN
7. QUINLAN
8. QUINLAN
9. QUINLAN
10. QUINLAN
11. QUINLAN
12. QUINLAN
13. QUINLAN
14. QUINLAN
15. QUINN
16. QUINN
17. QUINN

TABLE I-continued

18. QUINN
19. QUINN
20. QUINN
21. QUINN
22. QUINN
23. QUINN
24. QUINN
25. QUINN
26. QUINN
27. QUINN
28. QUINN
29. QUINN
30. QUINN
31. QUINN
32. QUINN
33. QUINN
34. QUINN
35. QUINN
36. QUINN
37. QUINN
38. QUINN
39. QUINNEY
40. QUINT
41. QUINT
42. QUINT
43. QUINT
44. QUINT
45. QUINTANA
46. QUINTANA
47. QUINTANA
48. QUINTER
49. QUINTIN
50. QUIRK
51. QUIST
52. QUIST
53. QUIST
54. QUIZAR
55. QUOCK
56. RAAB
57. RAAB
58. RAAB
59. RAABE
60. RAABE
61. RABAGO
.
.
.
166. RAINFORD
167. RAINFORD
168. RAINS
169. RAINS
170. RAINS
171. RAINS
.
.
.

The highly simplified example uses 171 consecutive LastName fields from a White Pages directory to illustrate the method. The 171 entries are numbered for convenience. In practical applications, the number of records of the database may be much larger and consist of multiple fields such as, for example, FirstName and StreetAddress fields associated with each of the LastNames.

There may be hundreds of thousands, or millions of records distributed among processors for rapid, reliable access. Database size and representation have no bearing on the present invention as long as the individual records may be targeted for retrieval by a series of inputs from an end user or application. These inputs may also be used to narrow the search by being directed toward a sequence of fields within records using repeated applications of the method described herein. In such a case, a search may proceed sequentially, according to one or more predetermined field search sequences, but in the same manner described herein.

The method of the present invention compresses the master database into a series of small trees that may be more easily stored as an auxiliary database in a memory device. The series of small trees may also be more efficiently searched for target records.

To prepare the master database for efficient search according to the present method, the allowable sequences of fields to be targeted must first be determined. In the example, only a single target field is illustrated. However, in practice, a limited number of characters might be accepted for each field before moving on to the next target field. In the example database given, the usefulness of more than three or four characters of the LastName field is quite limited. Thus, in practice, the implementation of this method might accept only three or four characters of the LastName field before moving to the FirstName or Street-Address fields to further narrow the search.

FIG. 1 illustrates a partial search tree representation of the White Pages database example shown in Table I. The tree itself has two major branches, "Q" and "R," representing the two possible first characters of the LastName field. These are shown in the first row of the tree-table. Below each major branch label are the number of records in the database remaining as search targets following the corresponding entries. For example, entering a search string beginning with "Q" leaves 55 candidates in the database that match the target string—in this case, the first 55 LastNames. Likewise, entering a search string beginning with "R" leaves 116 candidates.

The search of the tree proceeds down one level with each new search string entry. If the character entered does not appear in the corresponding row (to the left of the vertical border partitioning the branches), the search fails, i.e., there are no corresponding records in the database. In the example presented, the search string Q-U-A would fail immediately because there is no "A" in the third row. In fact, inspection of the tree reveals that all entries in the database beginning with "Q" begin with Q-U-I (54 records) or Q-U-O (1 record, QUOCK).

A search of the derived trees yields convergence information as each alphanumeric character in the search string is entered, consisting of the number of entries found—from zero up to a settable maximum number. To illustrate, assume the search target is "QUINTER," a LastName that does, in fact, appear in the example database. Upon entering "Q" the search is narrowed from the total 171 records to 55, as shown below the "Q" in the first row. Entering "U" still leaves 55 candidates, i.e., all records beginning with "Q" begin with "QU." Entering "I" leaves 54; "N," 49; "T," 10; "E," 1; and "R," 1.

While simple, this example illustrates how the progress of the search is contained in the tree representation of the original database. Furthermore, in the particular application, if it is desirable to display as many as 10 records (but fewer than 49), the search can be terminated and the record retrieval and display begun after the entry of "T" in this example. That is, the tree contains sufficient information to assure that all remaining candidates can be displayed.

Figure 2:
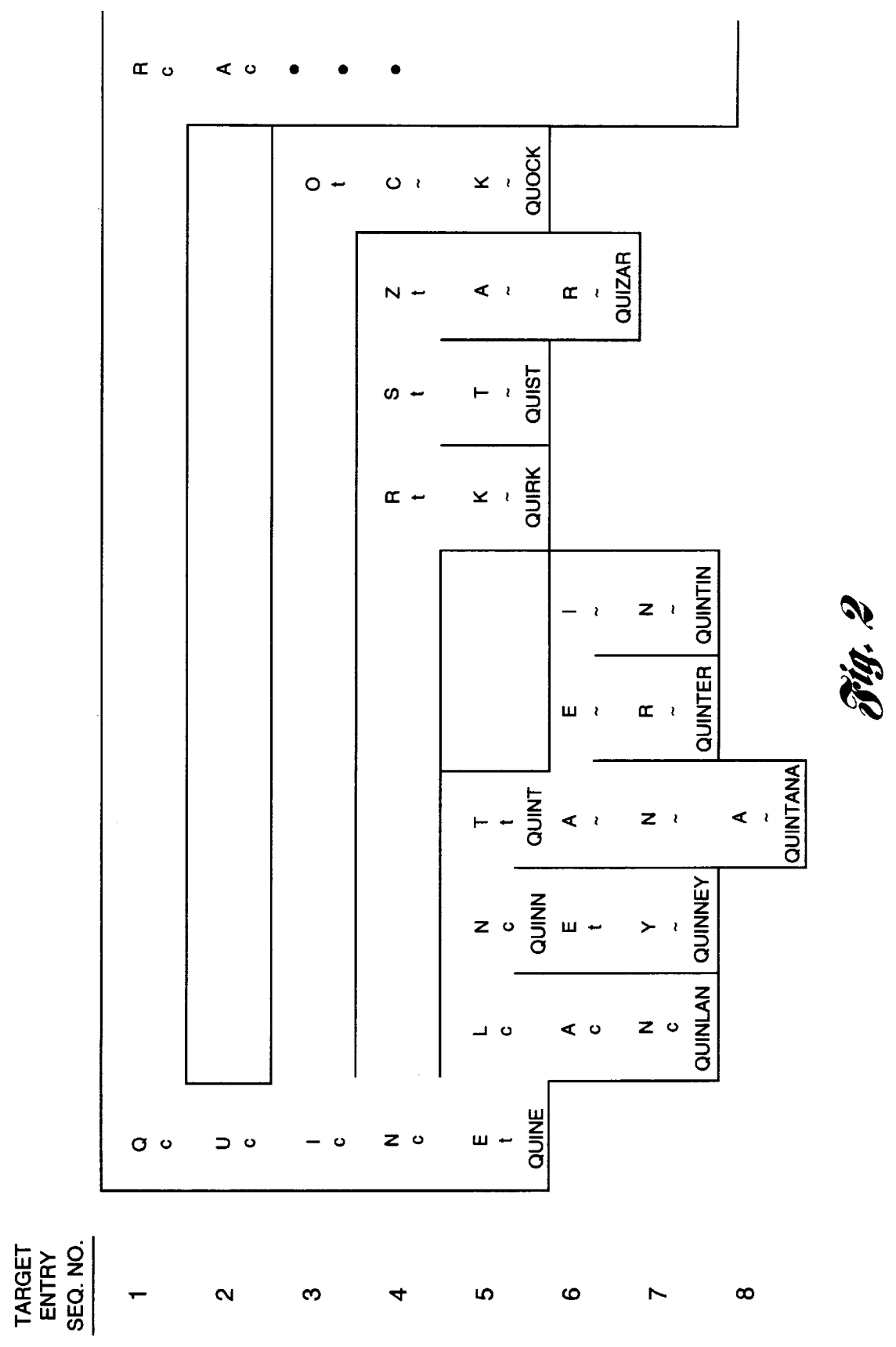

FIG. 2 illustrates how compression of the search tree begins. Using a maximum candidate record criterion of 10, as in the example of the previous paragraph, the search tree representation in FIG. 2 replaces the remaining records count at each node with either a "c" for "continue" accepting target string inputs or a "t" for "terminate" searching and begin retrieving 10 or fewer records from the full master database. Though not explicitly represented, the case of zero candidates is implicitly handled by showing no path continuation for an entry. For example, as mentioned above, Q-U-A has no path and would terminate the search with no corresponding record found.

The key property of this method is that, once the criterion candidate maximum is determined, the number of candidates can be represented by one of only three possibilities: terminate with no candidate records; terminate with the number of candidates not to exceed the predetermined criterion (10 in the example); and continue accepting target string characters. These three possibilities can be represented with only two bits; e.g., "00", "01", and "10", respectively. The two-bit "11" representation can be reserved to indicate an error in the application.

Once the search is terminated, if retrieval of the full record is desired, retrieval is effected from the original database using any conventional practice.

Depending on the sophistication of search tree representation, the size and target distribution of the database, the characteristics of the input and output devices, and the goals of the database search—all of which depend on the particular application being implemented—the achievable compression due to the method described herein may be considerable. In the present case, using only the "Q" branch of the search tree as an example, FIG. 3 illustrates the data structure that could be compiled for the search. It assumes that a maximum of five entries will be accepted to narrow the search with the LastName field.

The structure shown assumes full 8-bit ASCII input, data representation, and output capabilities for the input, storage, and display devices. Neglecting the addressing overhead (which could be considerable, depending on the search machine hardware and software), the "Q" branch of the example database, consisting of 55 entries totaling 317 ASCII characters, is represented with 12 characters and 12×2 additional bits to store the status information, i.e., "terminate, not found," "terminate, found," and "continue." Thus, the achieved compression ratio is $\{12\times(8+2)\}:(317\times 8)$, or more than 20:1.

Figure 4:
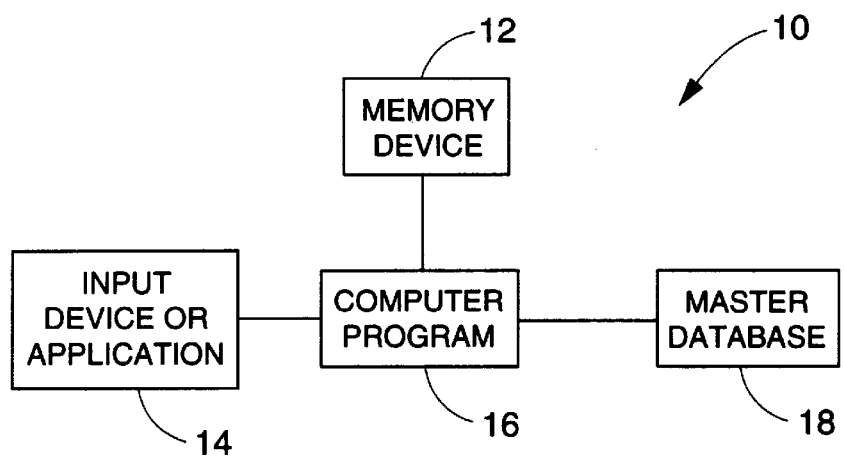
FIG. 4 is a simplified block diagram of the system of the present invention.

Turning now to FIG. 4, there is shown a simplified block diagram of the system of the present invention, denoted generally by reference numeral 10. The search tree is stored as an auxiliary database in memory device 12. The search tree includes information associated with the master database, such as the number of entries associated with each possible input signal, as shown in FIG. 1. Each one of these entries is then coded to indicate whether or not the search should continue based on the settable system criterion, or threshold.

An input signal, such as a search string, is entered via an input device 14. Input device 14 may be any conventional input device such as, for example, a terminal keyboard, a keypad of a touch-tone telephone, an application, or any other similar devices.

Computer program 16 receives the input signal and processes the input signal with the search tree in memory device 12 to determine the presence or absence of qualifying search targets, and their number, if any, relative to the settable threshold prior to actually searching the database. That is, computer program 16 determines whether or not a target record has been found and if so, whether or not an acceptable number of target records have been found. If retrieval of the full record is desired, retrieval is effected from the original master database 18 using any conventional practice.

The present invention reduces the access time to the database and provides immediate feedback of target information without actually accessing the database. Thus, the search attempts that result in no matching records do not require a database access and also shorten the search string entry to the minimum number necessary to determine that no matches exist. Similarly, the search attempts that result in more than the system criterion number of matching records do not require a database access. The degree of increase in effective system capacity depends on the proportion of such cases as well as other user and performance characteristics.

While the best modes for carrying out the invention have been described in detail, those familiar with the art to which this invention relates will recognize various alternative designs and embodiments for practicing the invention as defined by the following claims.

What is claimed is:

1. A computerized method for efficiently searching a master database for a desired target, the master database having a series of records, each consisting of one or more alphanumeric fields, the method comprising:

storing a series of search tree representations of the master database in an auxiliary database;

receiving an input signal having a plurality of alphanumeric characters identifying the desired target;

determining an intended alphanumeric field to be searched from among the alphanumeric fields contained in the master database; and processing a limited number of the alphanumeric characters of the input signal with the auxiliary database to determine the presence or absence of qualifying search target in the intended alphanumeric filed corresponding to the desired target without first accessing the master database.

2. The method as recited in claim 1 wherein storing the series of search tree representations includes storing convergence information that is yielded as the input signal is received, the convergence information consisting of a number of entries that are contained in the master database.

3. The method as recited in claim 2 wherein processing the input signal further includes processing the input signal with the auxiliary database to determine a number of qualifying search targets based on the convergence information upon determining the presence of qualifying search targets.

4. The method as recited in claim 3 wherein processing the input signal with the auxiliary database to determine the presence or absence of qualifying search targets includes determining a maximum number of allowable entries that are yielded according to the convergence information before terminating the search.

5. A system for efficiently searching a master database for a desired target, the master database having a series of records, each consisting of one or more alphanumeric fields, the system comprising:

a memory device for storing a series of search tree representations of the master database in an auxiliary database; and a computer program for receiving an input signal having a plurality of alphanumeric characters identifying the desired target, determining an intended alphanumeric field to be searched from among the alphanumeric fields contained in the master database, and processing a limited number of the alphanumeric characters of the input signal with the auxiliary database to determine the presence or absence of qualifying search targets in the intended alphanumeric field corresponding to the desired target without first accessing the master database.

6. The system as recited in claim 5 wherein the series of search tree representations includes convergence information that is yielded as the input signal is received, the convergence information consisting of a number of entries that are contained in the master database.

7. The system as recited in claim 6 wherein the computer program is further operative to determine a number of qualifying search targets based upon the convergence information upon determining the presence of qualifying search targets.

8. The system as recited in claim 7 wherein the computer program, in processing the input signal, is further operative to determine a maximum number of allowable entries that are yielded according to the convergence information before terminating the search.

* * * * *